(12) United States Patent
Shiraishi et al.

(10) Patent No.: US 6,549,373 B1
(45) Date of Patent: Apr. 15, 2003

(54) HEAD SUSPENSION ASSEMBLY WITH IC CHIP

(75) Inventors: Masashi Shiraishi, Tokyo (JP); Takeshi Wada, Tokyo (JP); Mitsuyoshi Kawai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/576,226

(22) Filed: May 22, 2000

(30) Foreign Application Priority Data

May 24, 1999 (JP) .......................... 11/143413

(51) Int. Cl.[7] ................ G11B 5/48; G11B 21/16
(52) U.S. Cl. ................ 360/244.1; 360/244.9
(58) Field of Search .............. 360/244.1, 244.2, 360/244.9

(56) References Cited

U.S. PATENT DOCUMENTS

2001/0043439 A1 * 11/2001 Ohwe et al. ............ 360/244.1

* cited by examiner

Primary Examiner—George J. Letscher
(74) Attorney, Agent, or Firm—Armstrong, Westerman & Hattori, LLP

(57) ABSTRACT

A head suspension assembly includes a magnetic head slider with at least one thin-film magnetic head element, a head IC chip with a circuit for the at least one thin-film magnetic head element, and a support member for supporting the magnetic head slider and the head IC chip. The support member has a recess portion for reducing a protruded height of the head IC chip at a position for mounting the head IC chip.

10 Claims, 2 Drawing Sheets

HEAD SUSPENSION ASSEMBLY WITH IC CHIP

FIELD OF THE INVENTION

The present invention relates to a head suspension assembly used for a magnetic disk device, which includes a slider with at least one thin-film magnetic head element, a resilient suspension for supporting the slider and a head IC chip.

DESCRIPTION OF THE RELATED ART

In such magnetic disk device, the thin-film magnetic head element for writing magnetic information into and/or reading magnetic information from a magnetic disk is in general formed on the slider flying in operation above the rotating magnetic disk. The slider is fixed at a top end section of the suspension made of a resilient thin metal plate extended from one end of each movable arm of the magnetic disk device.

Recently, recording frequency in the magnetic disk rapidly increases to satisfy the requirement forever increasing data storage capacities and densities in today's magnetic disk devices. In order to realize higher frequency recording, proposed is a head suspension assembly structure with a suspension for supporting both a slider and a head IC chip of a driver circuit for the magnetic head element. According to this structure, since the length of lead lines from the driver circuit to the magnetic head element can be shortened, generation of unnecessary noises from the lead lines can be effectively suppressed resulting high frequency recording characteristics to improve.

Such head IC chip will generates large amount of heat due to the writing current flowing through the IC chip during recording operation. Thus, the IC chip is mounted on a surface of the suspension, which will oppose to the magnetic disk surface in operation, in order to obtain cooling effect of airflow produced by the rotation of the magnetic disk.

However, if the IC chip is mounted on the head suspension assembly, the thickness of the assembly increases by the mounting height of the IC chip. Generally, in the magnetic disk device, in order to increase the recording capacity per magnetic disk, both sides of each disk are used for recording. Also, in order to further increase recording capacity, two or more coaxially mounted magnetic disks are used for recording. Therefore, between two adjacent magnetic disks, two head suspension assemblies for writing/reading operations are existed. Thus, it is difficult to make small the whole thickness of the magnetic disk device with the IC chip mounted head suspension assemblies. This becomes serious problem particularly in a thin magnetic disk device mounted in a notebook type personal computer.

Usually, such suspension has a leaf spring structure. Therefore, if a gap between the head suspension assembly and the magnetic-disk surface is made small too much, the carried IC chip may contact with the disk surface due to bending of the spring. Thus, it is impossible to make the gap small. From this reason also, it is more difficult to make small the whole thickness of the magnetic disk device with the IC chip mounted head suspension assemblies.

Furthermore, since the IC chip is protruded from the suspension-surface, when the head suspension assembly moves at high speed in seeking operation, the IC chip will be influenced from the transverse wind causing resonance characteristics of the suspension such as its resonance level and its resonance frequency to change.

SUMMARY OF THE INVENTION

It is therefore an object of the present invention to provide a head suspension assembly, whereby its thickness can be kept small even if a head IC chip is mounted thereon.

According to the present invention, a head suspension assembly includes a magnetic head slider with at least one thin-film magnetic head element, a head IC chip with a circuit for the at least one thin-film magnetic head element, and a support member for supporting the magnetic head slider and the head IC chip. The support member has a recess portion for reducing a protruded height of the head IC chip at a position for mounting the head IC chip.

Since the support member that is a suspension has the recess portion at a position for mounting the head IC chip so that the protruded height of the head IC chip is reduced, the mounted height of the head suspension assembly can be made lower. Thus, it is possible to make small the whole thickness of the magnetic disk device with the head IC chip mounted head suspension assemblies. Also, a possibility that the head IC chip directly contacts to the disk surface decreases when an excessive shock is impressed to the magnetic disk drive. Thus, it is possible to solve problems of carrying the head IC chip on the suspension from occurring. Furthermore, since the protruded height of the head IC chip is small or zero, when the head suspension assembly moves at high speed in seeking operation, it will not be influenced from the transverse wind. In addition, by forming the recess portion in the suspension, the mechanical rigidity of the suspension is increased and thus its resonance characteristics are improved.

It is preferred that the assembly further includes a lead conductor member formed on the support member, the head IC chip being mounted on the lead conductor member, and that the lead conductor member has a recess portion for reducing a protruded height of the head IC chip at a position for mounting the head IC chip.

It is also preferred that the support member has a resilient load beam, a resilient flexure supported by the load beam, and a lead conductor member formed on the flexure. The head IC chip is mounted on the lead conductor member.

In this case, preferably the recess portion is formed in the flexure, the lead conductor member and the load beam at a position for mounting the head IC chip, or the recess portion is formed in the flexure and the lead conductor member at a position for mounting the head IC chip and a via hole is formed in the load beam at a position for mounting the head IC chip.

It is preferred that the recess portion has sidewall surfaces that are gradually inclined from a normal surface of the support member. In this case, the recess portion may have rounded junctions between the normal surface of the support member and the sidewall surfaces. Thus, even if the recess portion is formed, disconnection of the lead conductor can be effectively prevented.

It is also preferred that the recess portion has a flat bottom surface for mounting the head IC chip.

The recess portion may be formed so that only a part of the head IC chip is protruded from a normal surface of the support member, or that no part of the head IC chip may be protruded from a normal surface of the support member. In case that only a part of the head IC chip is protruded, cooling effect by airflow can be obtained, but influenced from the transverse wind. Also, the thickness of the assembly is increased and the resistance against excessive shock is reduced. In case that no part of the head IC chip is protruded, the thickness of the assembly is reduced and the resistance against excessive shock is increased but cooling effect by airflow is somewhat reduced.

Further objects and advantages of the present invention will be apparent from the following description of the preferred embodiments of the invention as illustrated in the accompanying drawings.

DESCRIPTION OF THE PREFERRED EMBODIMENTS

Figure 1:
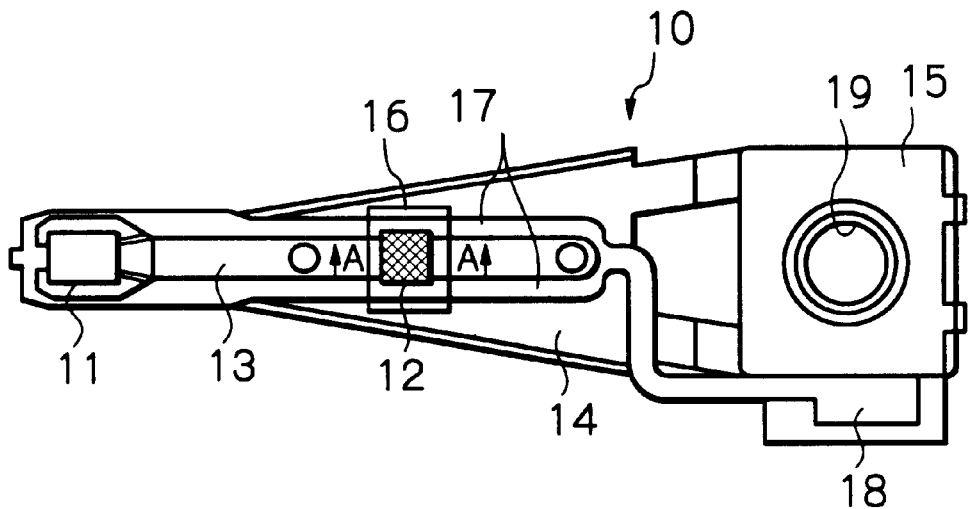
FIG. 1 shows a plane view schematically illustrating whole structure of a head suspension assembly in a preferred embodiment of the present invention.

FIG. 1 schematically illustrates whole structure of a head suspension assembly as a preferred embodiment of the present invention.

As shown in the figure, a head suspension assembly is assembled by fixing a slider 11 having a thin-film magnetic head element to a top end section of a suspension 10, and by mounting a head IC chip 12 on a middle location of this suspension 10. The slider 11 and the head IC chip 12 are fixed on a surface of the suspension 10, which will oppose to the magnetic disk surface in operation. This surface of the suspension is called hereinafter as a slider-attached surface.

The suspension 10 is substantially constituted by a resilient flexure 13 which carries the slider 11 at its tongue located near its top end section and supports the head IC chip 12 at its middle location, a resilient load beam 14 that supports and fixes the flexure 13, and a base plate 15 formed at a base end section of the load beam 14.

The load beam 14 has elasticity for suppressing the slider 11 toward the direction of a magnetic disk in operation. The flexure 13 has the flexible tongue centered by a dimple formed on the load beam 14 and has elasticity for supporting the slider 11 flexibly by this tongue. As will be noted, in this embodiment, the suspension 10 has a three-pieces structure constituted by individual components of the flexure 13, the load beam 14 and the base plate 15. In such three-pieces structure, stiffness of the flexure 13 is set to be lower than that of the load beam 14.

In the head IC chip 12, an integrated driver circuit constituting a head amplifier of the magnetic head element is formed. Although it is a mere example, the size of the IC chip 12 is 1.0 mm×1.0 mm×0.25 mm.

At a middle location of the suspension 10, the suspension has a recess portion 16 that is depressed toward the opposite surface from the slider-attached surface. In the recess portion 16, the head IC chip 12 is mounted so that the IC chip 12 is not protruded from the normal surface level of the suspension 10 or that the protruded height of the IC chip from the normal surface level reduces. The position of the recess portion 16 of the suspension 10 is in this embodiment determined so as to improve heat radiation characteristics and electromagnetic characteristics and to make mounting of the head IC chip easy.

The flexure 13 is made of in this embodiment a stainless steel plate (for example SUS304TA) with a thickness of about 25 μm and a width that is smaller than a width of the load beam 14.

A lead conductor layer of a thin-film pattern 17 that constitutes a plurality of lead lines or input/output signal lines is formed on the flexure 13 along its length. One end of the lead conductor 17 is connected via the head IC chip 12 to connection terminals 18 which will be connected to external circuits, and the other end of the lead conductor 17 is connected to connection terminals for the magnetic head slider 11 formed at the top end section of the flexure 13. The lead conductor layer 17 is formed by a known method similar to the patterning method of forming a printed circuit board on a thin metal plate such as a flexible printed circuit (FPC). For example, the lead conductor layer 17 is formed by sequentially depositing a first insulation material layer made of a resin such as polyimide with a thickness of about 5 μm, a patterned Cu layer (conductive layer) with a thickness of about 4 μm, and a second insulation material layer made of a resin such as polyimide with a thickness of about 5 μm on the flexure 13 in this order. Within the regions of the connection terminals to the magnetic head slider and to the external circuit and also connection pads to the IC chip 12, an Au layer is deposited on the Cu layer and there is no second insulation material layer on the Au layer.

The load beam 14 is made of in this embodiment a resilient stainless steel plate with a thickness of about 60–65 μm and supports the flexure 13 along its whole length. This load beam 14 has a shape with a width that narrows with approaching to its top end. Fixing of the flexure 13 to the load beam 14 is achieved by means of a plurality of welded spots.

The base plate 15 is made of a stainless steel or iron and is fixed to the base end section of the load beam 14 by welding. The suspension 10 will be attached to each movable arm (not shown) by fixing an attachment part 19 of the base plate 15 to the movable arm.

In modification, the suspension may be formed in a two-pieces structure with a base plate and a flexure-load beam instead of the three-pieces structure with the flexure 13, the load beam 14 and the base plate 15.

As aforementioned, the slider 11 with the magnetic head element is mounted on the tongue of the flexure 13 at the top end section of the suspension 10. The lead conductor layer 17 which includes the necessary number of lead lines passes both sides of the slider 11 and turns back at the top end section of the flexure 13 to the connection terminals so as to be electrically connected with input/output electrodes of the slider 11.

Figure 2:
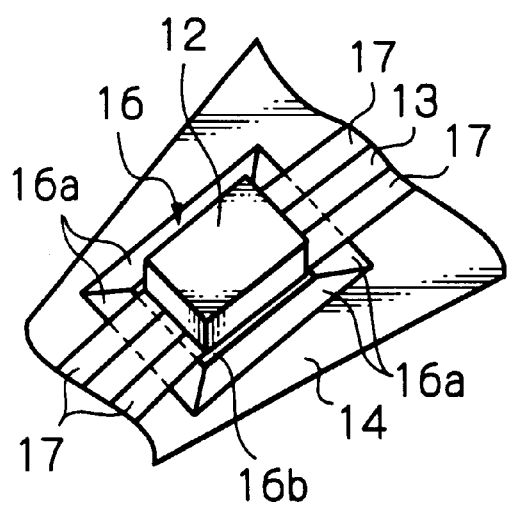
FIG. 2 shows an oblique view illustrating a part of a suspension in the embodiment of FIG. 1, on which part a head IC chip is mounted.
Figure 3:
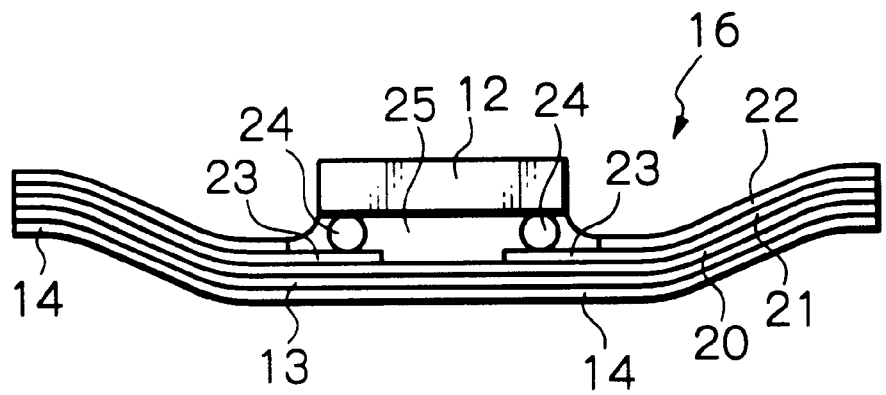
FIG. 3 shows an A—A line sectional view illustrating the part of the suspension in the embodiment of FIG. 1, on which part the head IC chip is mounted.

FIGS. 2 and 3 illustrate a part of the suspension 10 in the embodiment of FIG. 1, on which part the head IC chip 12 is mounted.

As shown in these figures, the suspension 10 has the recess portion 16 at a position for mounting the head IC chip 12. The depth of the recess portion 16 will be determined so that the head IC chip 12 is not protruded from the normal surface level of the suspension 10 as shown in FIG. 3. However, in modification, the depth of the recess portion 16 may be set so that a part of the head IC chip 12 is protruded from the normal surface level of the suspension 10.

Making a depression of the flexure 13, the lead conductor layer 17 and the load beam 14 as shown in FIG. 3, forms the recess portion 16 in this embodiment. On the opposite surface of the suspension 10 with respect to the slider-attached surface, ribs or box-bent portions are in general formed by press bending in order to improve the rigidity of the suspension. Thus, even if the bottom face of the recess portion 16 protrudes from the opposite suspension-surface, the total thickness of the suspension 10 will not increase. Also, since the recess portion 16 and the ribs can be simultaneously formed, no additional fabrication process is needed for making the recess portion 16.

The recess portion 16 has a bottom surface 16b and surrounding sidewall surfaces 16a that are gradually inclined from the normal surface of the suspension 10. It is desired to round junctions between the normal surface of the suspension 10 and the sidewall surfaces 16a on which the lead conductor layer 17 is formed. Since the sidewall surfaces 16a are gradually inclined and also the junctions between the normal surface of the suspension 10 and the sidewall surfaces 16a, namely outwardly bent junctions are rounded, no break or no disconnection of the lead conductor 17 will occur if the lead conductor 17 is formed to bend along the surfaces of the recess portion 16. Since junctions between the bottom surface 16b of the recess portion 16 and its sidewall surfaces 16a are inwardly bent, there is comparatively little fear of disconnection of the lead conductor 17. The bottom surface 16b of the recess portion 16 is formed in flat in order to mount the head IC chip 12.

As shown in FIG. 3, the lead conductor 17 is formed by sequentially depositing the first insulation material layer 20, the patterned conductive layer 21 and the second insulation material layer 22 on the flexure 13 in this order. The head IC chip 12 in this embodiment is formed by a bear chip and mounted on and connected by Cu bumps 24 to connection pads 23 formed on the way of the lead conductor layer 21 that is made in the recess portion 16. An underfill 25 is filled in a clearance between the bottom surface of the head IC chip 12 and the lead conductor layer so as to improve heat radiation characteristics, to improve mechanical strength, and to cover a part of the head IC chip 12.

According to the embodiment, the suspension 10 has the recess portion 16 at a position for mounting the head IC chip 12 so that the IC chip 12 is not protruded from the normal surface level of the suspension 10 or that the protruded height of the IC chip 12 from the normal surface level reduces. Since the protruded height of the mounted head IC chip 12 from the slider-attached surface is small or zero, the mounted height of the head suspension assembly can be made lower. Also, since the thickness of the assembly can be reduced, it is possible to make small the whole thickness of the magnetic disk device with the IC chip mounted head suspension assemblies resulting its space efficiency to improve. Furthermore, since the protruded height of the IC chip 12 is small or zero, when the head suspension assembly moves at high speed in seeking operation, it will not be influenced from the transverse wind. In addition, by forming the recess portion 16 in the suspension 10, the rigidity of this suspension 10 is increased and thus its resonance characteristics are improved.

Figure 4:
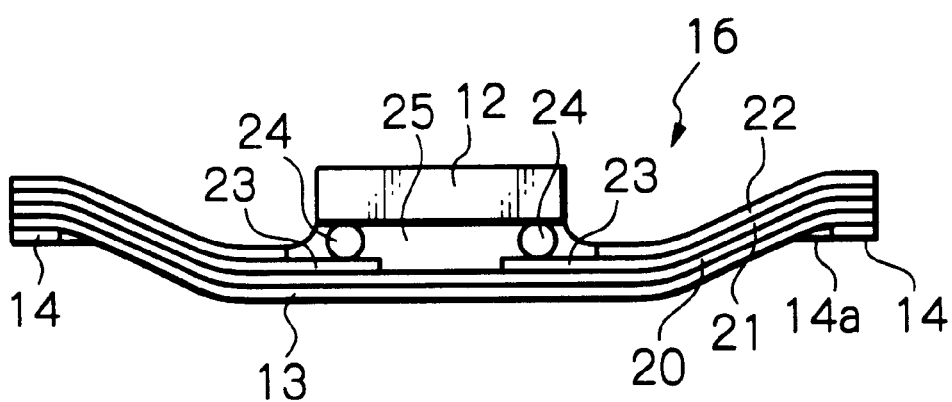
FIG. 4 shows an A—A line sectional view illustrating a part of a suspension in another embodiment of the present invention, on which part a head IC chip is mounted.

FIG. 4 illustrates a part of a suspension in another embodiment of the present invention, on which part a head IC chip is mounted.

In this embodiment, at a position for mounting a head IC chip 12, a recess portion 16 is formed in a flexure 13 and a lead conductor layer 17 formed on the flexure 13. The recess portion 16 is not formed in a load beam 14 but a via hole 14a is formed. Another constitutions, operations and advantages in this embodiment are the same as those in the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head suspension assembly comprising:

a magnetic head slider with at least one thin-film magnetic head element;

a head IC chip with a circuit for said at least one thin-film magnetic head element; and a support member for supporting said magnetic head slider and said head IC chip, said support member having a recess portion for reducing a protruded height of said head IC chip at a position for mounting said head IC chip, wherein a heat conductive substance is disposed between the head IC chip and the support member in the recess portion to conduct heat and add mechanical strength.

2. The head suspension assembly as claimed in claim 1, wherein said assembly further comprises a lead conductor member formed on said support member, said head IC chip being mounted on said lead conductor member, and wherein said lead conductor member has a recess portion for reducing a protruded height of said head IC chip at a position for mounting said head IC chip.

3. The head suspension assembly as claimed in claim 1, wherein said support member has a resilient load beam, a resilient flexure supported by said load beam, and a lead conductor member formed on said flexure, said head IC chip being mounted on said lead conductor member.

4. The head suspension assembly as claimed in claim 3, wherein said recess portion is formed in said flexure, said lead conductor member and said load beam at a position for mounting said head IC chip.

5. The head suspension assembly as claimed in claim 3, wherein said recess portion is formed in said flexure and said lead conductor member at a position for mounting said head IC chip, and wherein a via hole is formed in said load beam at a position for mounting said head IC chip.

6. The head suspension assembly as claimed in claim 1, wherein said recess portion has sidewall surfaces that are gradually inclined from a normal surface of said support member.

7. The head suspension assembly as claimed in claim 6, wherein said recess portion has rounded junctions between the normal surface of said support member and said sidewall surfaces.

8. The head suspension assembly as claimed in claim 1, wherein said recess portion has a flat bottom surface for mounting said head IC chip.

9. The head suspension assembly as claimed in claim 1, wherein said recess portion is formed so that only a part of said head IC chip is protruded from a normal surface of said support member.

10. The head suspension assembly as claimed in claim 1, wherein said recess portion is formed so that no part of said head IC chip is protruded from a normal surface of said support member.

* * * * *